(12) United States Patent
Gordon-Duffy et al.

(10) Patent No.: US 8,597,768 B2
(45) Date of Patent: Dec. 3, 2013

(54) LAMINATED FOAMS WITH MATING PEAKS AND GROOVES

(75) Inventors: John Gordon-Duffy, Wollishofen (CH); Anett Borgwardt, Thalwil (CH)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/636,714

(22) PCT Filed: Apr. 20, 2011

(86) PCT No.: PCT/US2011/033139
§ 371 (c)(1),
(2), (4) Date: Sep. 24, 2012

(87) PCT Pub. No.: WO2011/136990
PCT Pub. Date: Nov. 3, 2011

(65) Prior Publication Data
US 2013/0034700 A1   Feb. 7, 2013

Related U.S. Application Data

(60) Provisional application No. 61/328,685, filed on Apr. 28, 2010.

(51) Int. Cl.
*B32B 5/18* (2006.01)
(52) U.S. Cl.
USPC ............ 428/158; 428/98; 428/156; 156/257; 264/139; 264/141; 264/248; 264/249; 264/296

(58) Field of Classification Search
USPC ............ 428/98, 156, 158; 156/257; 264/139, 264/141, 248, 249, 296; 425/296
See application file for complete search history.

(56) References Cited

U.S. PATENT DOCUMENTS 4,067,758 A * 1/1978 Sommer .................. 156/91

FOREIGN PATENT DOCUMENTS

| DE | 19815170 A1 | 10/1999 |
|---|---|---|
| DE | 10315090 A1 * | 10/2004 |
| EP | 1213118 A2 | 6/2002 |
| EP | 1457517 A1 | 9/2004 |
| EP | 1688237 B1 | 10/2009 |
| GB | 1446627 | 8/1976 |

OTHER PUBLICATIONS

Machine Translation of DE10315090. 2004.*
Machine Translation of EP1213118. 2002.*

* cited by examiner

*Primary Examiner* — Maria Veronica Ewald
*Assistant Examiner* — Brian Handville
(74) *Attorney, Agent, or Firm* — Steven W. Mork

(57) ABSTRACT

A laminated foam article contains at least two foam boards having mating peak and groove surface profiles where surface skin remains on at least a portion of the profiles and wherein the foam boards are laminated to one another in a mating orientation with the peaks of one foam surface within the grooves of the adjoining foam surface with an adhesive between the mating surfaces of the foams and wherein the laminated foam article has a thickness that exceeds 200 millimeters.

10 Claims, 3 Drawing Sheets

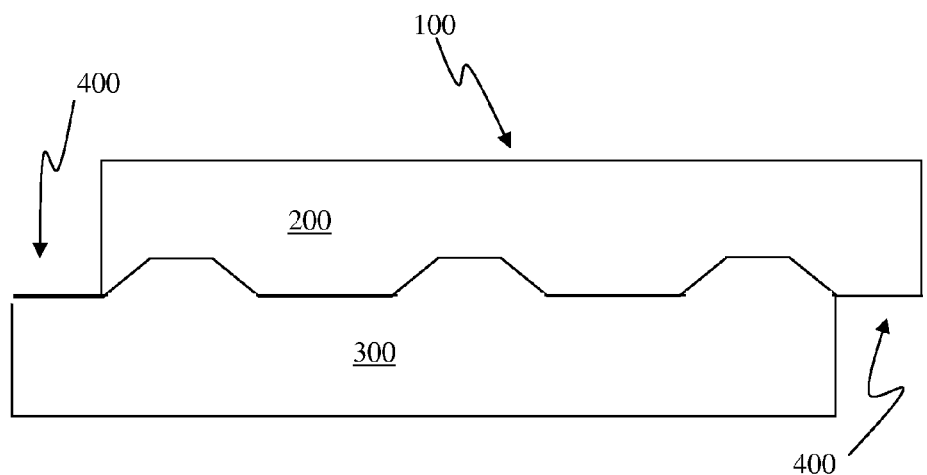
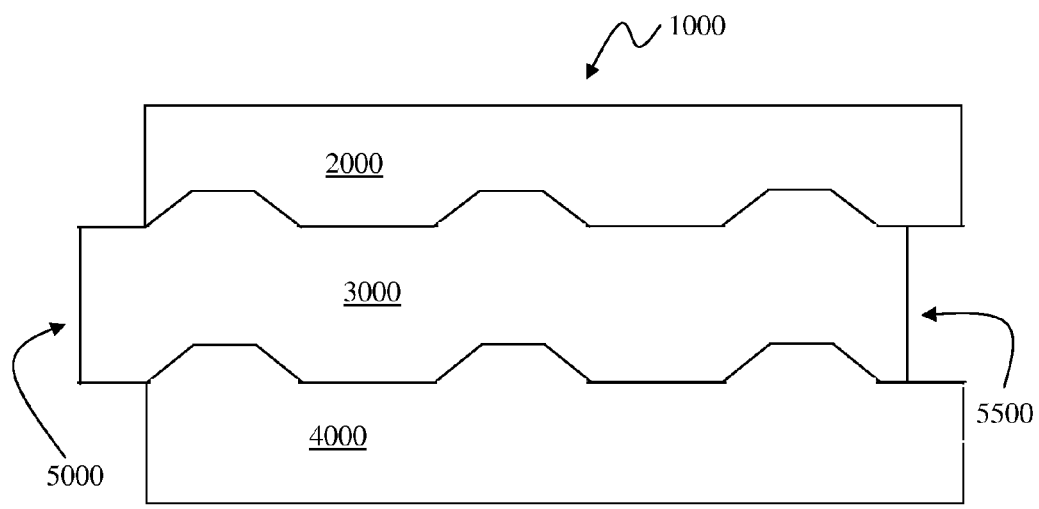

LAMINATED FOAMS WITH MATING PEAKS AND GROOVES

CROSS REFERENCE STATEMENT

This application claims the benefit of U.S. Provisional Application No. 61/328,685, filed Apr. 28, 2010, the entire content of which is incorporated herein by reference.

BACKGROUND OF THE INVENTION

1. Field of the Invention

The present invention relates to laminated polymeric foam board articles comprising two or more polymeric foam boards laminated together to increase foam board thickness as well as a process for preparing such laminated foam board articles.

2. Description of Related Art

There is a desire in the field of polymeric foam boards to prepare boards having a thickness that exceeds 200 millimeters and to do so without using hydrochlorofluorocarbon blowing agents. Foam boards of such a thickness are desirable to prepare building structures with high levels of thermal insulation as well as other structures such as parking deck structures. Unfortunately, it is very difficult to extrude polymeric foam of good quality at a thickness that exceeds 200 millimeters using non-hydrochlorofluorocarbon blowing agents.

Freely stacking thinner boards is one way to achieve a greater thickness, but it is undesirable because the boards can slip during installation and even while in place if not installed securely. Slippage is a particular concern for parking deck applications where foam boards can experience frequent shear forces as traffic moves over them. Moreover, stacking multiple boards together at a construction site increases labor difficulties in handling and installing the multiple boards as well as creates opportunity for moisture to accumulate between boards and thereby increase thermal conductivity.

A single laminated board of desirable thickness is obtainable by gluing multiple boards together. Often, however, an application requires that a foam board have water vapor permeability, desirably homogeneous water vapor permeability, in order to avoid trapping moisture against a structure framework. Unless multiple boards are glued in such a manner that maintains water vapor permeability through the foam boards and the glued interface moisture build-up can be problematic. European Patent (EP) 1213118 discloses a solution to laminating boards together while maintaining water vapor permeability through the foam and glue interface. EP1213118 requires removing foam skin from entire surfaces of foam boards that adjoin one another and then adhering them together with a diffusion open adhesive.

It is desirable and would advance the art to provide laminate foam boards that have retained or increased water vapor permeability (decreased water vapor diffusion resistance) relative to laminated foam boards comprising skin on both adhered surfaces, but that did not require removing entire skins from foam surfaces. It would be further advantageous if the laminate of foam boards enjoyed particularly high shear strength so they would be well suited for flooring and parking deck applications.

BRIEF SUMMARY OF THE INVENTION

The present invention offers a solution to the problem of providing laminate foam boards having retained or increased water vapor permeability (decreased water vapor diffusion resistance) relative to laminated foam boards comprising skin on both adhered surface but without requiring removal of entire surface skins from the foam prior to adhering them together. Moreover, the present invention further provides a solution to concomitantly obtaining high shear strength for a laminated foam article.

In a first aspect, the present invention is a laminated foam article comprising at least two foam boards having mating peak and groove surface profiles where surface skin remains on at least a portion of the profiles and wherein the foam boards are laminated to one another in a mating orientation with the peaks of one foam surface within the groove of the adjoining foam surface with an adhesive between the mating surfaces of the foams and wherein the laminated foam article has a thickness that exceeds 200 millimeters.

In a second aspect, the present invention is a process for laminating foam boards together comprising the steps: (a) defining mating peak and groove surface profiles into surfaces of the foam boards; (b) applying adhesive to at least one of the surfaces having mating peak and groove surface profiles; and (c) affixing the mating peak and groove surface profiles of the foam boards together by positioning the peaks of one board's surface into the grooves of the other foam surface such that the adhesive is between the foam surfaces and contacting both surfaces.

The process of the present invention is useful for the manufacture of the article of the present invention. The article of the present invention is useful for insulating building structures such as homes, businesses and parking decks.

BRIEF DESCRIPTION OF THE DRAWINGS

FIG. 3 illustrates two polymeric foam boards laminated together in an offset mating orientation to create ship-lap profiles on opposing edges.

FIG. 4 illustrates three polymeric foam boards laminated together in an offset mating orientation to create mating tongue-and-groove profiles on opposing edges.

DETAILED DESCRIPTION OF THE INVENTION

Figure 1:
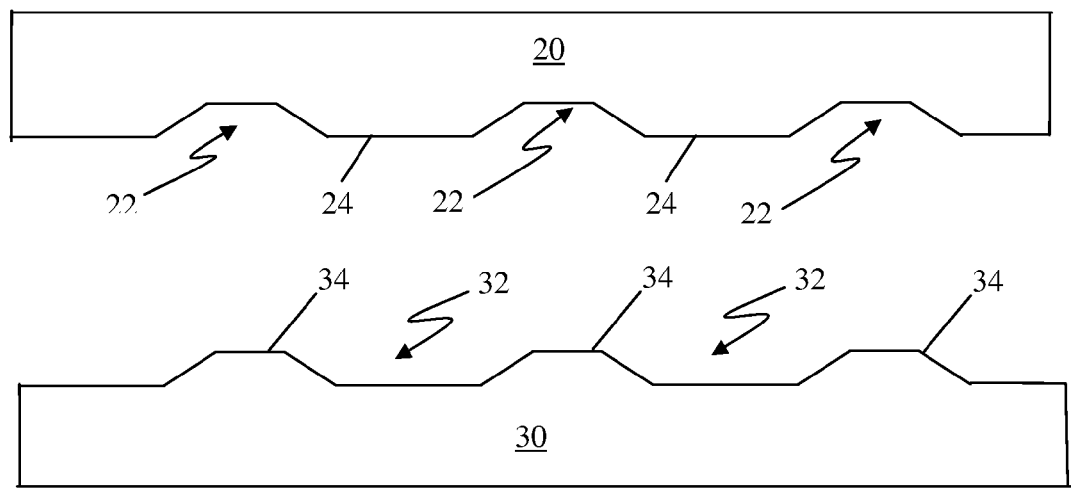
FIG. 1 illustrates two polymeric foam boards having mating profile configurations.

Test methods refer to the most recent test method as of the priority date of this document unless a date is indicated with the test method number. References to test methods contain both a reference to the testing society and the test method number. Test method organizations are referenced by one of the following abbreviations: ASTM refers to American Society for Testing and Materials; EN refers to European Norm; DIN refers to Deutsches Institute für Normung; and ISO refers to International Organization for Standards.

Foam articles have three mutually perpendicular dimensions: length, width and thickness. The length dimension lies along the longest dimension of a foam article and typically is along the extrusion direction of an extruded foam article. The thickness dimension is the dimension that has the smallest magnitude but can be equal to the length in, for example, a cube. Width is mutually perpendicular to length and thickness and can have a magnitude equal to or less than the length and equal to or greater than the thickness.

"And/or" means "and, or as an alternative". All ranges include endpoints unless otherwise indicated.

The present invention uses and/or contains polymeric foam boards (foam boards). The foam boards can be any polymeric foam board without limitation. Generally, the foam boards are selected from polyurethane foam boards, expanded foam bead board and extruded foam board. While the composition of the polymeric foam boards is not a limitation, the foam boards do necessarily have mating peak and groove surface profiles. "Mating peak and groove profiles" are peak profiles and groove profiles that fit together such that the peaks profiles fit into the grooves and wherein the grooves are essentially a negative of the peaks—that is, the groove is a space of essentially the same size and shape as the peak so the peak (and any adhesive between the peak and groove) essentially fills the groove profile. An artisan understands that perfectly fitting foam pieces together is challenging so use of "essentially" in defining mating peak and groove profiles allows for less than perfect fitting and/or filling of the groove profile by the peak profile. Desirably, 95% or more, preferably 98% or more, still more preferably 99% or more and most preferably 100% of the groove space is filled by a mating peak and any adhesive used to adhere the board containing the peak to the board defining the groove. Generally grooves have a depth (and mating peak profiles have a height) of two millimeters (mm) or more, preferably five mm or more and 15 mm or less, preferably 10 mm or less.

The at least two foam boards are laminated to one another in a mating orientation with the peaks of one foam surface within the groove of the adjoining foam surface. "Mating orientation" is a position such that the peaks of one profile are fit within the grooves of another profile. Placing foam boards in a mating orientation self-centers and self-aligns one board with respect to the other board of the mating pair. Each mating foam surface can have only peak profiles, only groove profiles, or a combination of peak and groove profiles.

Figure 2:
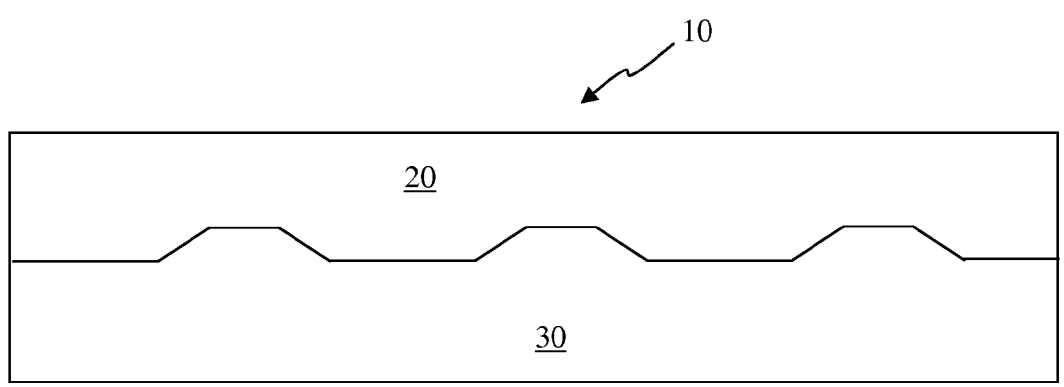
FIG. 2 illustrates the two polymeric foam boards of FIG. 1 in a mating orientation.

In one particularly desirable embodiment at least some, preferably all of the peaks are have a trapezoidal profile, most preferably an isosceles trapezoid profile. A trapezoidal profile resembles a trapezoid with the top of the peak and base serving as parallel sides. Generally, the trapezoidal profile will have the larger parallel side at the base adjacent to the foam board. However, the profiles can be similar to dovetails joints where the larger parallel side is the side most remote from the base adjacent to the foam board. Mating grooves for trapezoidal peaks will also have trapezoidal profiles. FIGS. 1 and 2 illustrate board with mating trapezoidal peak and groove profiles. Board 20 has trapezoidal grooves 22 and trapezoidal peaks 24. Board 30 has trapezoidal groove 32 and trapezoidal peaks 34. Peaks 24 mate with grooves 32 and peaks 34 mate with grooves 22 to form laminated foam article 10 illustrated in FIG. 2. FIG. 2 illustrates boards 20 and 30 in a mating orientation.

Uncharacteristic of, for example, the laminate structure of EP1213118, surface skin remains on at least a portion of the surfaces that are adhesively affixed to one another. Generally, surface skin remains on the top of the profile peaks. EP1213118 specifically requires removal of all surface skin prior to adhering foam boards together to form a laminate. The present invention does not require removal of all surface skin from foam boards prior to laminating them together and yet the present invention can still achieve water vapor diffusion permeability factors comparable and can be even higher than structures laminated together with their skins in tact (skin-on-skin orientation).

The at least two adjoining foam boards have an adhesive between the mating surfaces of the foams. Desirably, the adhesive is a "diffusion open" adhesive. "Diffusion open" has definition in DIN4108-3 (2001) as having a water vapor diffusion equivalent air thickness ($S_D$-value) of 0.5 meters or less. This is the definition for "diffusion open" adopted herein. Determine whether a material is diffusion open according to DIN 4108-3 (2001). An advantage of using a diffusion open adhesive is that higher water vapor permeability (lower water vapor diffusion resistance) is obtainable for a laminated foam article relative to similar use of a non-diffusion open adhesive. A diffusion open adhesive can cover entire adjoining surfaces or can cover only a portion of an adjoining surface that is less than the entire adjoining surface. In one embodiment, the diffusion open adhesive resides predominately on foam surface skins on the peak profiles, that is, most of the adhesive on a surface containing peak profiles is on the portion of the surface that still has surface skin. Examples of suitable diffusion open adhesives include one and two component polyurethanes, hot melt adhesives and reactive adhesives. The diffusion open adhesive can be a foamable adhesive such as a one or two part polyurethane foam adhesive.

If the adhesive is not diffusion open, then it is desirable to coat less than a full surface of each adjoining foam board with adhesive in order to achieve desirable water vapor permeability between the foam boards. For example, application of adhesive can be limited to only the portion of the foam board profiles that contains surface skin.

Despite having foam surface skin present at the interface between laminated foam boards, the laminated foam article of the present invention surprisingly has high water vapor permeability (low water vapor diffusion resistance). The laminated foam article of the present invention desirably has a water vapor diffusion resistance factor ($\mu$) of 135 or less, preferably 130 or less through the thickness of the foam, which includes permeability through the interface of laminated foam boards even with a foam skin present at the interface between adjoining foam boards. Measure water vapor diffusion resistance factor according to the procedure of EN12086.

The laminated foam board of the present invention further demonstrates greater shear strength between foam board layers than is achievable with laminates comprising flat board surfaces adhered to one another. By inserting peaks into grooves on adjoining boards the two boards lock into configuration and are unable to easily slip over one another. As a result, the shear strength is desirably increased with the present method of lamination. Shear strengths in the length dimension typically exceed 250 kiloPascals (kPa), and can be 300 kPa or more, even 350 kPa or more. Shear strength in the horizontal (width) dimension of the foam typically exceeds 175 kPa and can exceed 190 kPa and even 200 kPa. Since the foam boards are precluded from sliding past one another the shear strength is typically limited by the shear strength of any individual foam board layer, which is likely to rip apart at shear failure. Determine shear strength according to the procedure of EN 12090.

The laminated foam article has a thickness of greater than 200 millimeters, and can have a thickness of 250 millimeter or more, 300 millimeters or more, 400 millimeters or more, even 500 millimeters or more. There really is no technical limitation to the possible thickness the present laminate foam article can achieve. In like manner, there is no technical limitation to the number of foam boards that can be laminated together to form the laminated foam article of the present invention. Typically, the laminated article contains two or more laminated foam boards, but it can comprise three or more laminated foam boards, four or more laminated foam boards, even five or more laminated foam boards. All adjoining boards desirably, though not necessarily, have mating peak and groove profiles in the laminated structure. Desirably, when three or more foam boards comprise the article of the present invention, foam boards are in a sandwich configuration with one or more foam boards (interior boards) between adjoining foam boards. Interior foam boards can have peak profiles on both opposing surfaces, groove profiles on each opposing surface, groove profiles on one surface and peak profiles on an opposing surface or a combination of peak and groove profiles on both opposing surface. Foam boards laminated to the interior boards in a mating configuration have profiles that can mate with the surface profile of the interior board.

In a desirable embodiment, the laminated foam article has mating laps on opposing edges. Mating laps include ship-lap and tongue-in-grove profiles. Mating laps can be readily incorporated into the laminated foam article of the present invention by offsetting one or more foam board component from other foam board components in the laminated article. For example, offsetting one board with respect to the other so that each board extends past the other on two edges creates lap joints on opposing edges. When three boards are laminated together, offsetting the middle board from the others will generate opposing tongue-in-groove profiles. FIG. 3 illustrates laminated foam article 100 with foam boards 200 and 300 in a mating orientation but offset from one another to form mating ship lap profiles 400 on opposing edges. FIG. 4 illustrates laminated foam article 1000 with foam boards 2000, 3000, and 4000 in a mating orientation but offset from one another to form mating tongue and groove profiles, 5000 and 5500 respectively, on opposing edges.

Prepare the laminated foam article of the present invention by first providing at least two polymeric foam boards having defined therein mating peak and groove surface profiles. Define the mating peak and groove surface profiles in any way conceivable including the following non-exhaustive list of possibilities: molding directly into the foam board, cutting away foam, compressing foam (for example, cold forming the profiles into the foam boards). When defining the peak profiles leave at least a portion of surface skin on the peak profiles—typically on the very top of the peak.

Apply diffusion open adhesive to at least one of the surface having mating peak and groove surface profiles and optionally to both surfaces. The adhesive may be primarily located on the skin portions of the peak profiles, may cover all of one surface or may cover any portion of one surface.

Affix the mating peak and groove surface profiles of the two foam boards together in a mating orientation by positioning the peaks of one board's surface into the grooves of other foam surface such that adhesive is between the foam surfaces and contacting both surfaces.

EXAMPLES

The following example serves as an illustration of an embodiment of the present invention.

Prepare each of the following comparative examples and example using as polymeric foam boards STYROFOAM™ FLOORMATE™200-A brand extruded polystyrene insulation (STYROFOAM and FLOORMATE are trademarks of The Dow Chemical Company). The polymeric foam boards are 80 mm thick, 600 mm wide and 1200 mm long. As the diffusion open adhesive use MOR-AD® 660M brand one component adhesive (MOR-AD is a trademark of Rohm and Haas Chemicals LLC). Apply the adhesive at a loading of approximately 120 grams per square meter as described for each sample below. After adhering boards together allow to cure for 12 hours under pressure to ensure optimal adhesion.

Test each resulting laminated foam article for shear strength and shear modulus in both the extrusion (length) and horizontal (width) dimension using the procedure of EN12090. Also test the resulting laminated foam article for tensile strength tensile modulus according to the procedure in EN1607. Tensile testing is done by applying force perpendicular to the adjoined surfaces of the boards; perpendicular to the interface of the mating surfaces. Finally, measure the water vapor diffusion resistance factor ($\mu$) through the foam in the thickness dimension (perpendicular to the lamination interface) according to the procedure of EN12086.

A description of the sample laminated foam articles is below along with a table indicating the test results for shear modulus, shear strength, tensile modulus, tensile strength and water vapor diffusion resistance factor ( ).

Comparative Example (Comp Ex) A

Flat Boards with Skin

Adhere three polymeric foam boards together with skins on both adhering surfaces to create laminated foam article Comp Ex A. Apply adhesive over the full surface of one of each pair of adhering surfaces prior to adhering the boards together. The resulting laminated board, Comp Ex A, has a total thickness of 240 mm Comp Ex B Flat Boards with Planed Surfaces Adhere three polymeric foam boards together after planing off the surface skin from the adhering surfaces to create laminated foam article Comp Ex B. Apply adhesive over the full surface of one of each pair of adhering surfaces prior to adhering the boards together. The resulting laminated board, Comp Ex B, has a total thickness of 220 mm Comp Ex C Flat Boards with One Planed Surface and One Skin Adhere three polymeric foam boards together after planing off the surface skin from one of the adhering surfaces, adhering the planed surface to a surface containing surface skin to create laminated foam article Comp Ex C. Apply adhesive over the full surface of one of each pair of adhering surfaces prior to adhering the boards together. The resulting laminated board, Comp Ex C, has a total thickness of 220 mm Example (Ex) 1

Trapezoidal Profiled Mating Surfaces

Figure 5:
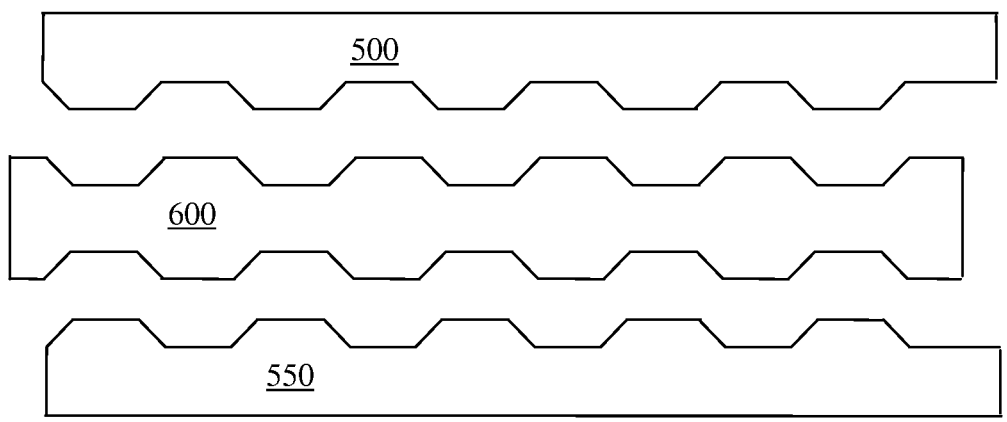
FIG. 5 illustrates a polymeric foam boards having trapezoidal peaks and grooves.
Figure 6:
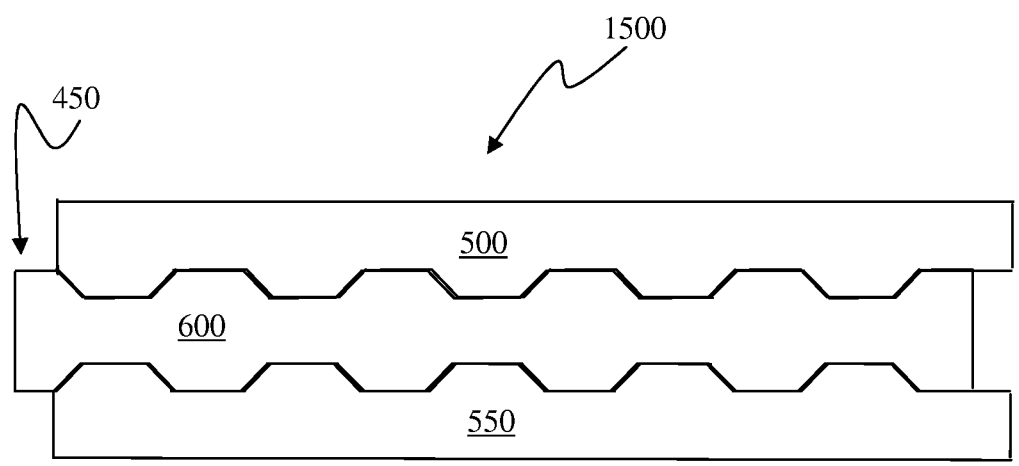
FIG. 6 illustrates three polymeric foam boards in mating configuration forming a laminate foam article with ship laps along the edges of the laminated foam article.

Mill the surface of three polymeric foam boards to have six mating trapezoidal peaks and grooves similar boards 500, 550 and 600 shown in FIG. 5 while leaving surface skin on the top of each peak (the short side of the two parallel sides of the trapezoidal peak). The trapezoidal peaks have approximately the following dimensions: peak height is 10 mm, top of the peak has a width of 45 mm base of the peak has a width of 55 mm. The mating grooves have just the negative dimensions. Mill the boards so that the trapezoidal peaks and grooves extend the full length of the foam boards, though similar results are expected if the peaks and grooves extended the width instead of the length. Adhere the boards 550, 550 and 600 together in a mating configuration as shown in FIG. 6 so as to create 15 millimeter ship lap 450 on opposing edges of the resulting laminated foam article 1500. Apply adhesive to just the 45 millimeter wide peak of the profiles on each board prior to adhering the boards together. The resulting laminated board, Ex 1, has a total thickness of 220 mm.

Characterization test results are in Table 1 for these four samples:

TABLE 1

| Sample | Shear Strength (kPa) | | Shear Modulus (kPa) | | Tensile Strength (kPa) | Tensile Modulus (kPa) | Water Vapor Diffusion Resistance Factor (μ) |
|---|---|---|---|---|---|---|---|
| | Extrusion | Horizontal | Extrusion | Horizontal | | | |
| Comp Ex A | 204 | 154 | 6500 | 4740 | 149 | 11257 | 138 |
| Comp Ex B | 193 | 98 | 8290 | 6020 | 177 | 18640 | 108 |
| Comp Ex C | 199 | 168 | 7430 | 5660 | 220 | 16305 | 117 |
| Ex 1 | 299 | 194 | 8520 | 6030 | 227 | 21585 | 126 |

This data illustrates the surprising result of the strength of the profiled laminate boards of Ex 1 relative to the other laminate configurations while at the same time achieving improved water vapor permeability (reduced water vapor diffusion resistance) over skin-on-skin laminates.

The invention claimed is:

1. A laminated foam article comprising at least two foam boards having mating peak and groove surface profiles defined by cutting away foam where surface skin remains on at least a portion of the profiles and wherein the foam boards are laminated to one another in a mating orientation with the peaks of one foam surface within the groove of the adjoining foam surface with an adhesive between the mating surfaces of the foams and wherein the laminated foam article has a thickness that exceeds 200 millimeters.

2. The laminated foam article of claim 1, wherein the adhesive is an adhesive having a water vapor diffusion equivalent air thickness of 0.5 meters or less according to DIN4108-3 (2001).

3. The laminated foam article of claim 1, wherein the adhesive covers a portion that is less than the entire of each mating surface.

4. The laminated foam article of claim 1, wherein the adhesive resides predominately on foam surface skins.

5. The laminated foam article of claim 1, further characterized as having a water vapor diffusion resistance factor of less than 135 as determined according to EN12086, a shear strength in the length dimension that exceeds 250 kiloPascals, and a shear strength in the width dimension that exceeds 175 kiloPascals where shear strength is determined according to EN12090.

6. The laminated foam article of claim 1, where the mating peaks and grooves have a trapezoidal profile.

7. The laminated foam article of claim 1, wherein the foam boards are offset with respect to one another so as to make opposing mating lips along opposing edges of the laminated foam article.

8. A process for laminating foam boards together comprising the steps:
  a. defining mating peak and groove surface profiles into surfaces of the foam boards by cutting away foam while leaving a portion of surface skin on the peak profiles;
  b. applying adhesive to at least one of the surfaces having mating peak and groove surface profiles; and
  c. affixing the mating peak and groove surface profiles of the foam boards together by positioning the peaks of one board's surface into the grooves of the other foam surface such that the adhesive is between the foam surfaces and contacting both surfaces so as to form a laminated foam article having a thickness of greater than 200 millimeters.

9. The process of claim 8, wherein the adhesive is a one- or two-part foamable adhesive.

10. The process of claim 8, wherein the foam boards are offset with respect to one another so as to make opposing mating lips along opposing edges of the laminated foam article.

* * * * *